(12) United States Patent
Hao et al.

(10) Patent No.: US 8,719,910 B2
(45) Date of Patent: May 6, 2014

(54) VIDEO BROADCASTING TO MOBILE COMMUNICATION DEVICES

(75) Inventors: Jack Jianxiu Hao, Lexington, MA (US); Fang Zhu, Wobum, MA (US); Ishan Awasthi, Wilmington, MA (US); Jian Huang, Sudbury, MA (US); Ashraf M. Shehata, Tampa, FL (US); Sean Shuai Wu, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 414 days.

(21) Appl. No.: 12/893,700

(22) Filed: Sep. 29, 2010

(65) Prior Publication Data

US 2012/0079577 A1 Mar. 29, 2012

(51) Int. Cl.
*H04L 29/06* (2006.01)
(52) U.S. Cl.
USPC ............... 726/7; 709/227; 709/228; 709/229; 709/231; 709/232
(58) Field of Classification Search
USPC ........................................................... 726/7
See application file for complete search history.

(56) References Cited

U.S. PATENT DOCUMENTS

| | | | |
|---|---|---|---|
| 2002/0049852 A1* | 4/2002 | Lee et al. ....................... | 709/231 |
| 2002/0062361 A1* | 5/2002 | Kivipuro et al. ............... | 709/219 |
| 2003/0007464 A1* | 1/2003 | Balani ............................ | 370/310 |
| 2003/0097564 A1* | 5/2003 | Tewari et al. .................. | 713/171 |
| 2003/0131353 A1* | 7/2003 | Blom et al. ....................... | 725/25 |
| 2003/0140257 A1* | 7/2003 | Peterka et al. ................ | 713/201 |
| 2003/0163569 A1* | 8/2003 | Panasyuk et al. ............. | 709/227 |
| 2003/0177028 A1* | 9/2003 | Cooper et al. ...................... | 705/1 |
| 2004/0019801 A1* | 1/2004 | Lindholm et al. ............. | 713/200 |
| 2004/0230797 A1 | 11/2004 | Ofek et al. | |
| 2005/0010536 A1* | 1/2005 | Cochran et al. ................. | 705/76 |
| 2005/0120209 A1* | 6/2005 | Kwon et al. ................... | 713/161 |
| 2005/0131832 A1 | 6/2005 | Fransdonk | |
| 2005/0273489 A1* | 12/2005 | Pecht et al. .................... | 709/203 |
| 2006/0206709 A1* | 9/2006 | Labrou et al. ................. | 713/167 |
| 2008/0077791 A1 | 3/2008 | Lund et al. | |
| 2009/0260067 A1* | 10/2009 | Racabi .............................. | 726/7 |

OTHER PUBLICATIONS

Roy et al., A System Architecture for Managing Mobile Streaming Media Services, May 2003, Proceedings of the 23rd International Conference on Distributed Computing Systems Workshops , vol. 3, pp. 408-413.*

* cited by examiner

*Primary Examiner* — Morshed Mehedi
*Assistant Examiner* — Kenneth Chang

(57) ABSTRACT

A device receives login information and a content stream request from a user device connected to a wireless access network, and authenticates, via a backend server device, the user device based on the login information. The device also provides, when the user device is authenticated, a content link and a license key to the user device, and the user device provides the content link and the license key to a content delivery device. The device further verifies the license key for the content delivery device, and the content delivery device establishes a secure connection with the user device via the wireless access network, retrieves the requested content stream based on the content link, and provides the content stream to the user device via the secure connection.

17 Claims, 7 Drawing Sheets

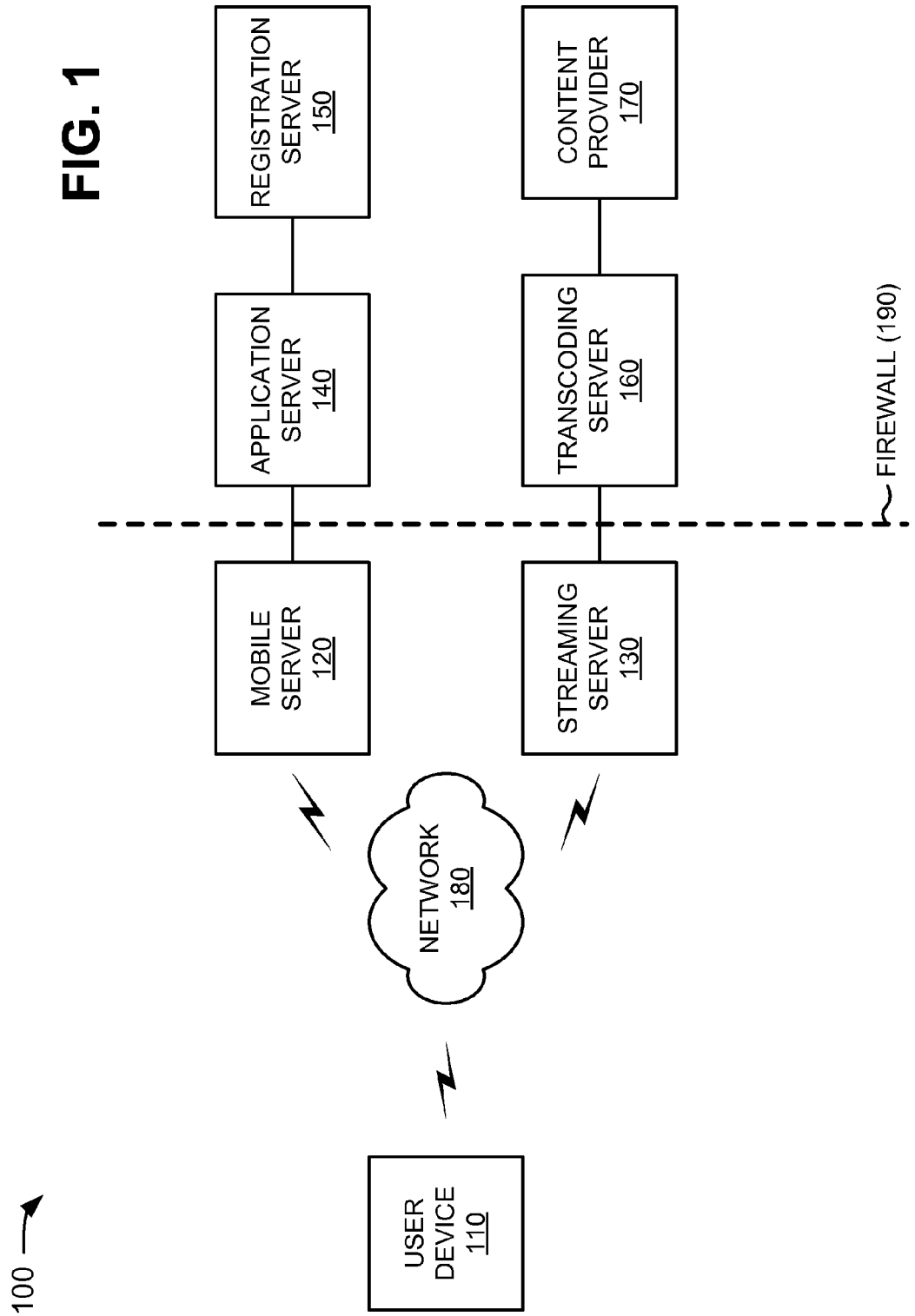

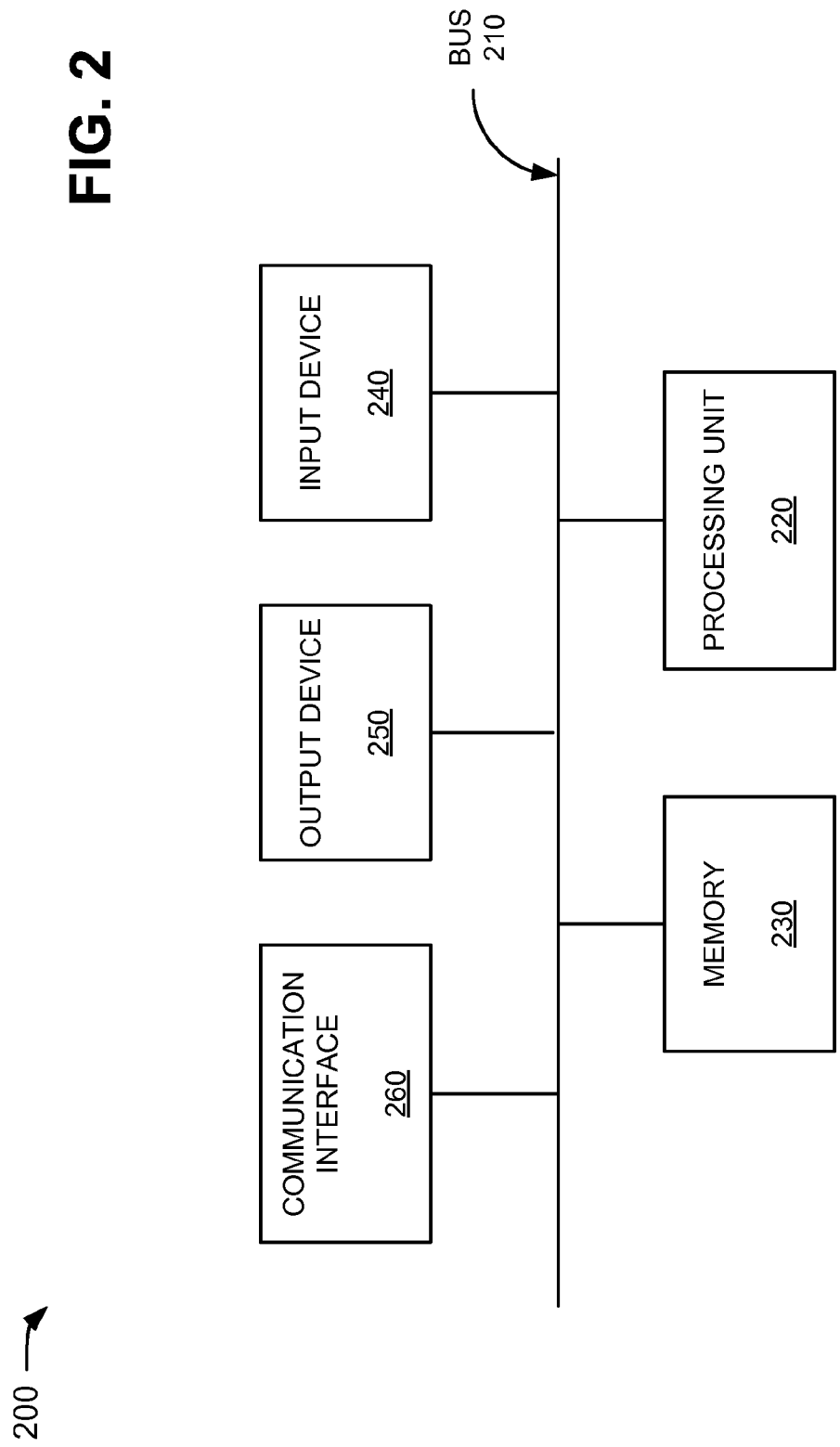

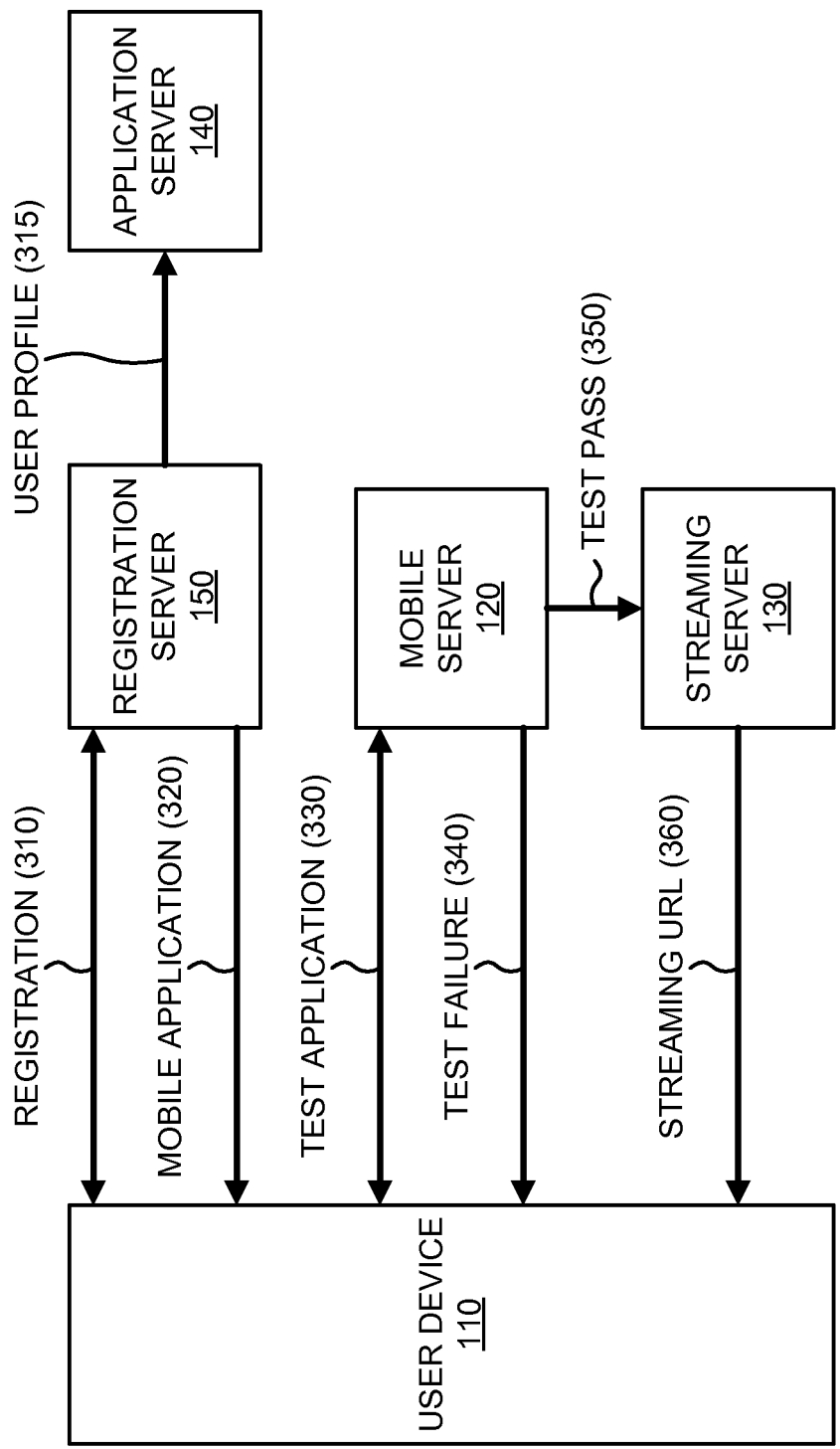

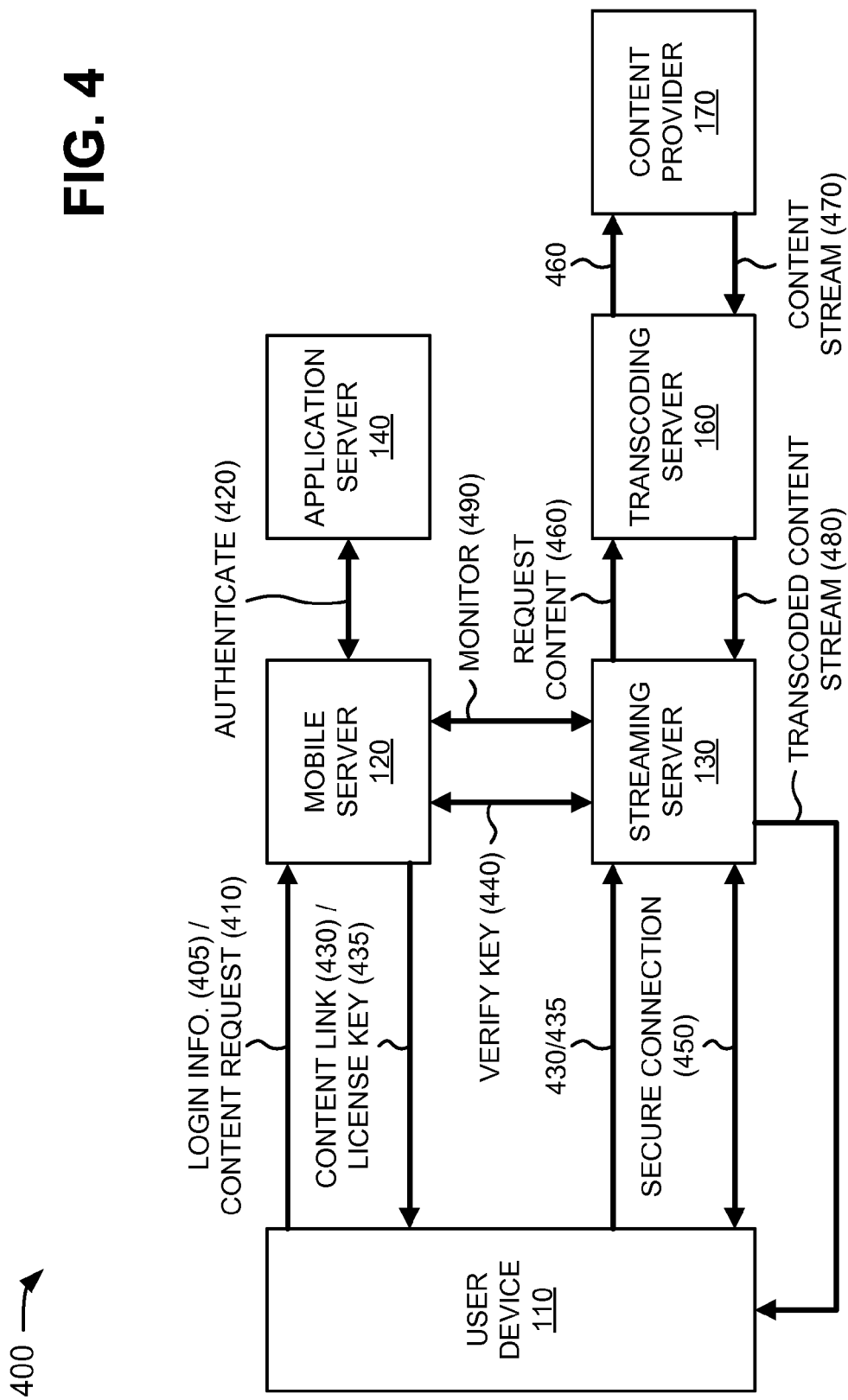

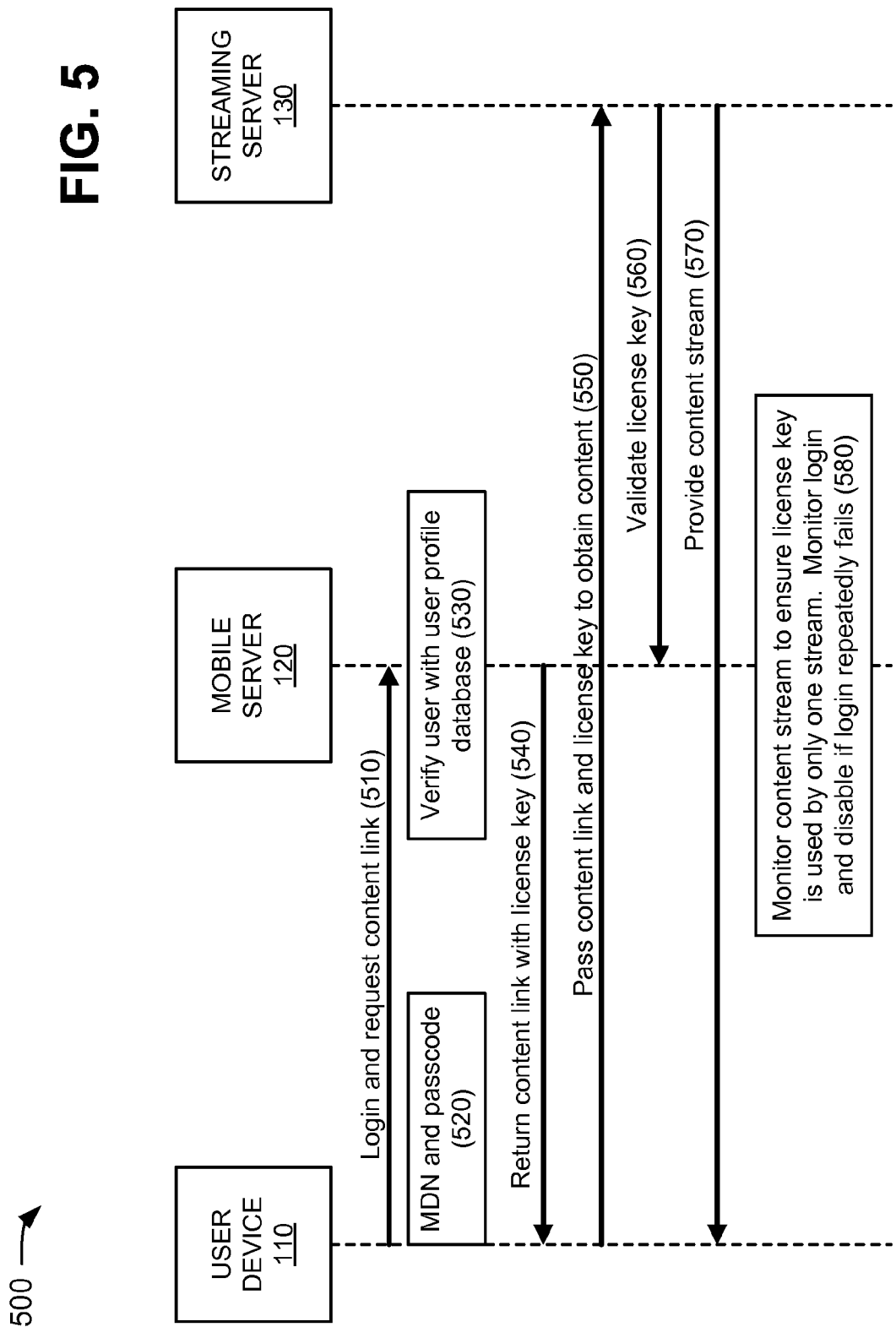

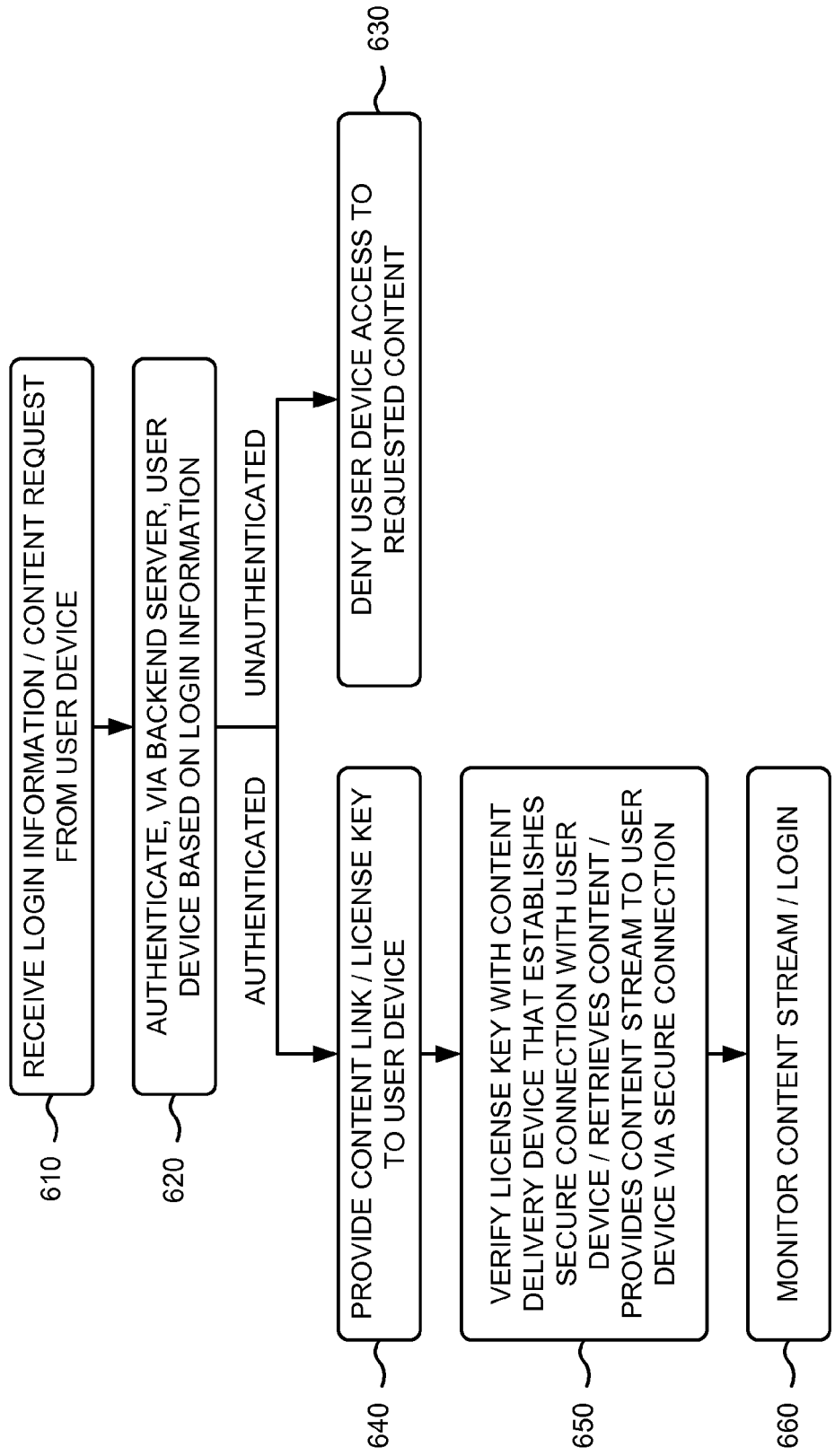

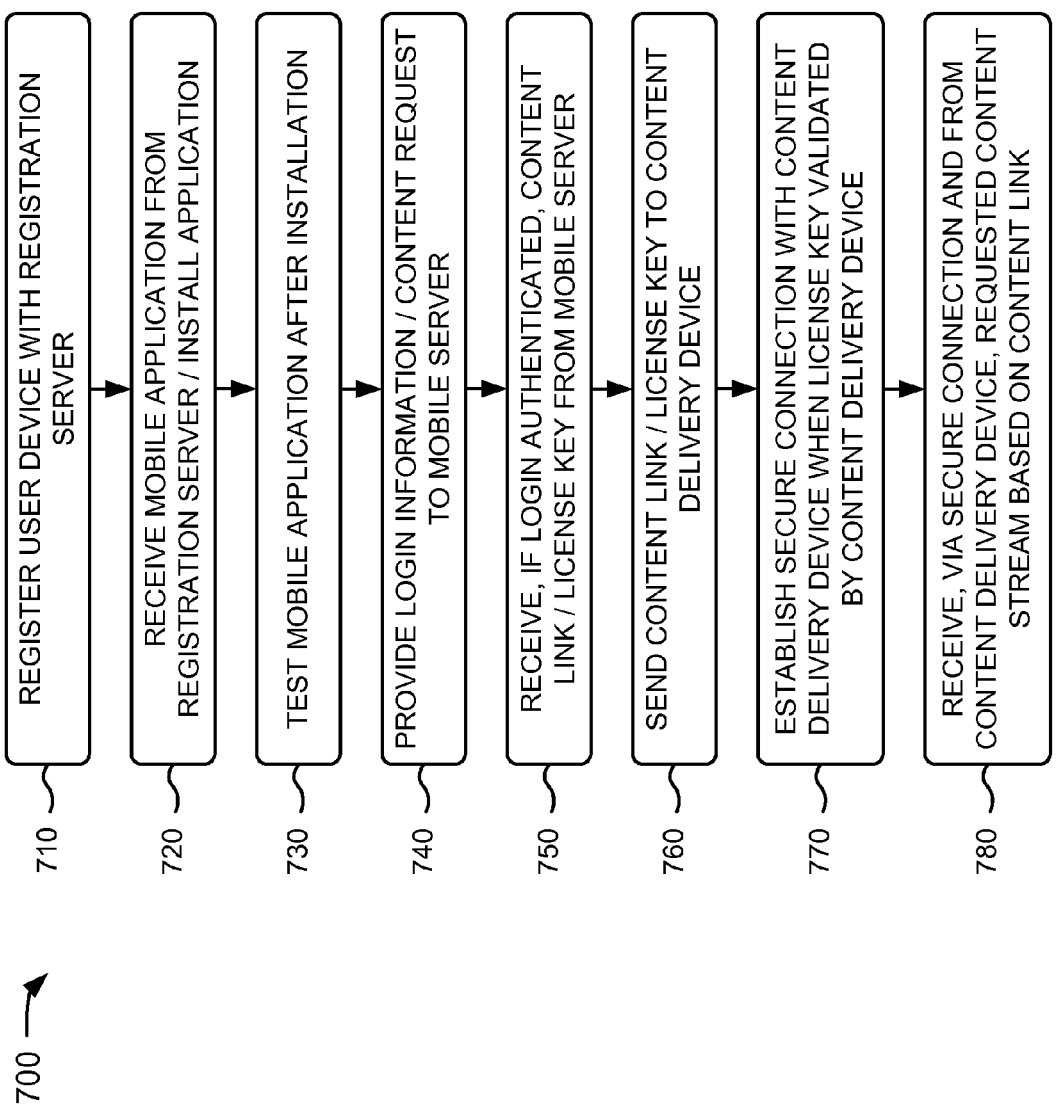

VIDEO BROADCASTING TO MOBILE COMMUNICATION DEVICES

BACKGROUND

As wireless network data rates improve using third generation (3G), fourth generation (4G), and WiFi technologies, more and more bandwidth-intensive applications are being developed. Video broadcast over the Internet is becoming a significant part of Internet traffic with video portals provided by content providers, such as Hulu™, YouTube, CNN, etc. Video content is also becoming more popular with applications provided via mobile communication devices, such as smart phones (e.g., the Motorola DROID, the iPhone, etc.). Much of the video content provided by such content providers and/or applications is high bit rate content that may not be optimized for wireless networks. Wireless service providers have no control over this off-network video content. If content delivery is not optimized for wireless networks, video content may become a choking point for the wireless networks. This may result in poor user experiences and degraded services (e.g., provided by the wireless networks) for other applications like voice-over-Internet protocol (VoIP).

BRIEF DESCRIPTION OF THE DRAWINGS

FIG. 1 is a diagram of an example network in which systems and/or methods described herein may be implemented;

FIG. 2 is a diagram of example components of one or more of the devices of the network depicted in FIG. 1;

FIG. 3 is a diagram of example interactions between components of an example portion of the network illustrated in FIG. 1;

FIG. 4 is a diagram of example interactions between components of another example portion of the network illustrated in FIG. 1;

FIG. 5 is a flow diagram of example interactions between components of still another example portion of the network depicted in FIG. 1;

FIG. 6 is a flow chart of an example process for broadcasting video content to mobile communication devices according to implementations described herein; and FIG. 7 is a flow chart of another example process for broadcasting video content to mobile communication devices according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may reliably broadcast video content (e.g., streaming video content or progressive download video content) to mobile communication devices. The systems and/or methods may provide authentication procedures that are integrated with backend servers and a mobile application executing on the mobile communication device. The systems and/or methods may provide session-based streaming content delivery to prevent unauthorized hijacking of the content. The mobile application may check with the backend servers to validate and update session keys, which may ensure seamless broadcast streaming.

In one example implementation, the systems and/or methods may provide a mobile application to a user device (e.g., a mobile communication device, such as a personal digital assistant (PDA), a smart phone, etc.). The mobile application may obtain information associated with the user device (e.g., a mobile equipment identifier (MEID), a mobile directory number (MDN), a user password, etc.), and may provide the information to a backend server using a secure connection. If the backend server authenticates the user device (e.g., based on the information), a license key and a content link (e.g., that requests the content) may be delivered to the user device. The user device may utilize the license key to establish a secure connection with a content delivery device, and may utilize the content link to request video content from the content delivery device. The content delivery device may transcode the requested video content (e.g., to a format that the user device can play), and may stream the transcoded video content to the user device (e.g., for playback) via the secure connection.

In another implementation, for example, the systems and/or methods may receive login information and a content request from the user device, and may authenticate, via a backend server, the user device based on the login information. If the user device is not authenticated, the systems and/or methods may deny the user device access to the requested content. If the user device is authenticated, the systems and/or methods may provide a content link (e.g., that requests the content) and a license key to the user device, and may verify the license key with a content delivery device. If the content delivery device verifies the license key, the content delivery device may establish a secure connection with the user device, may retrieve the requested content (e.g., as set forth in the content link), and may provide a content stream to the user device via the secure connection. The systems and/or methods may monitor the login attempt by the user device (e.g., to prevent multiple failed login attempts), and may monitor the content stream (e.g., to ensure that the license key is used by a single content stream).

As used herein, the terms "viewer," "subscriber," and/or "user" may be used interchangeably. Also, the terms "viewer," "subscriber," and/or "user" are intended to be broadly interpreted to include a user device (e.g., a mobile communication device) or a user of a user device.

FIG. 1 is a diagram of an example network 100 in which systems and/or methods described herein may be implemented. As illustrated, network 100 may include a user device 110, a mobile server 120, a streaming server 130, an application server 140, a registration server 150, a transcoding server 160, a content provider 170, and a network 180. Components of network 100 may interconnect via wired and/or wireless connections. A single user device 110, mobile server 120, streaming server 130, application server 140, registration server 150, transcoding server 160, content provider 170, and network 180 have been illustrated in FIG. 1 for simplicity. In practice, there may be more user devices 110, mobile servers 120, streaming servers 130, application servers 140, registration servers 150, transcoding servers 160, content providers 170, and/or networks 180.

As further shown in FIG. 1, application server 140, registration server 150, transcoding server 160, and content provider 170 may be provided behind a firewall 190. Thus, one or more of application server 140, registration server 150, transcoding server 160, and content provider 170 may be referred to herein as a "backend device" or "backend devices." Furthermore, one or more of streaming server 130, transcoding server 160, and content provider 170 may be referred to herein as a "content delivery device" or "content delivery devices."

User device 110 may include any device that is capable of communicating with one or more of mobile server 120, streaming server 130, application server 140, registration server 150, transcoding server 160, and content provider 170 via a wireless network (e.g., network 180). For example, user device 110 may include a mobile computation and/or communication device, such as a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc.

Mobile server 120 may include one or more server devices, or other types of computation or communication devices, that gather, process, and/or provide information in a manner described herein. For example, mobile server 120 may include a device that is capable of communicating with user device 110 (e.g., via network 180) and with the Internet (not shown). In one implementation, mobile server 120 may receive login information (e.g., a MDN and a passcode associated with user device 110) and a content request (e.g., for video content) from user device 110. Mobile server 120 may authenticate user device 110 (e.g., based on the login information and via application server 140) before providing a content link (e.g., a link to request secure delivery of video content by streaming server 130) to user device 110 via a secure connection (e.g., a hypertext transfer protocol secure (HTTPS) connection). If user device 110 fails authentication, mobile server 120 may not provide the content link to user device 110, and user device 110 may be denied access to video content.

Streaming server 130 may include one or more server devices, or other types of computation or communication devices, that gather, process, and/or provide information in a manner described herein. For example, streaming server 130 may include multiple devices (e.g., where each device supports multiple video streams) that are capable of communicating with user device 110 (e.g., via network 180) and with the Internet. In one implementation, when user device 110 is authenticated by mobile server 120, streaming server 130 may securely stream video content (e.g., a streaming uniform resource locator (URL)) directly to user device 110. For security purposes, the streaming URL may be session based so that the streaming URL may be used only once by a single user device 110, and so that user device 110 may periodically check with mobile server 120 to ensure that a session has not expired. In one example, the streaming video content may include digital content and/or analog content. Streaming server 130 may stream video content (e.g., in multiple formats) locally to user device 110 (e.g., via network 180). By streaming video content locally, streaming server 130 may efficiently provide video content to user device 110 without being dependent upon content provider 170.

Application server 140 may include one or more server devices, or other types of computation or communication devices, that gather, process, and/or provide information in a manner described herein. For example, application server 140 may include a device that is capable of communicating with mobile server 120 and/or registration server 150. In one implementation, application server 140 may support a user registration service (e.g., provided by registration server 150) by validating registering users (e.g., via a database) and by providing mobile server 120 with secure access to registered users' profiles. Mobile server 120 may utilize the registered users' profiles to authenticate user devices (e.g., user device 110) attempting to access content from streaming server 130. Application server 140 may define parameters for network 100, such as how many users can be registered in one region (e.g., for delivery of video content), how many user devices can connect to network 180 (e.g., to prevent traffic congestion), etc. In one example, application server 140 may provide the network parameters to mobile server 120, and mobile server 120 may implement the network parameters.

Registration server 150 may include one or more server devices, or other types of computation or communication devices, that gather, process, and/or provide information in a manner described herein. For example, registration server 150 may include a device that is capable of communicating with user device 110, mobile server 120, and/or application server 140. In one implementation, registration server 150 may require a single sign-on (SSO) or global login for a user to register user device 110 for viewing content (e.g., live video broadcasting). Once user device 110 is registered, registration server 150 may provide a message (e.g., a Short Message Service (SMS) message) that instructs user device 110 about downloading a mobile application (e.g., an application that enables user device 110 to access video broadcasts provided by network 100). Registration server 150 may send a separate communication (e.g., an email) to the user's email account. The separate communication may include a passcode (e.g., a four-digit passcode) for user device 110. The passcode may be entered by the user during installation of the mobile application on user device 110, and may be saved by user device 110 (e.g., for authenticating user device 110 each time user device 110 requests content from network 100).

Transcoding server 160 may include one or more server devices, or other types of computation or communication devices, that gather, process, and/or provide information in a manner described herein. For example, transcoding server 160 may include a device that is capable of communicating with streaming server 130 and content provider 170. In one implementation, transcoding server 160 may receive content (e.g., a video content stream) from content provider 170, and may transcode (or convert) the video content stream to a format that user device 110 may utilize (e.g., playback). In one example, transcoding server 160 may convert the video content stream to an International Telecommunication Union (ITU)-T H.264/Moving Picture Experts Group (MPEG4) format with a bit rate of two-hundred and fifty-six (256) kilobits per second (kbps). Transcoding server 160 may provide the transcoded video content stream to streaming server 130, and streaming server 130 may provide the transcoded video content stream to user device 110 (e.g., via network 180).

Content provider 170 may include one or more server devices, or other types of computation or communication devices, that gather, process, search, and/or provide information in a manner described herein. In one implementation, content provider 170 may include a computer system, an application, a cable head-end, and/or a broadcasting device capable of providing video content (e.g., VOD content, high definition (HD)-VOD content, TV programming, movies, on-demand services, live television, etc.) in a variety of formats, commercials, advertisements, instructions, and/or other information. In one example, content provider 170 may receive a request for a video content stream from streaming server 130, and may provide the requested video content stream to transcoding server 160. Transcoding server 160 may transcode (or convert) the video content stream, as described above, and may provide the transcoded video content stream to streaming server 130.

Network 180 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one example implementation, network 180 may provide a wireless access network for user device 110. The wireless access network, in one implementation, may correspond to a 4G network, a Long Term Evolution (LTE) network, an advanced LTE network, etc. The wireless access network may include a communications network that connects subscribers (e.g., user device 110) to a service provider (e.g., mobile server 120 and/or streaming server 130). In another implementation, the wireless access network may include a WiFi network or other access networks (e.g., an enhanced high-rate packet data (eHRPD) network or a WiMax network).

Firewall 190 may include one or more computation or communication devices that regulate types of traffic entering and/or exiting a portion of a network (e.g., a private network, a portion of network 100 that includes application server 140, registration server 150, transcoding server 160, and content provider 170, etc.). For example, firewall 190 may exercise control over incoming and/or outgoing traffic to or from restricted portions of network 100.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of example interactions between components of an example portion 300 of network 100. As illustrated, example network portion 300 may include user device 110, mobile server 120, streaming server 130, application server 140, and registration server 150. User device 110, mobile server 120, streaming server 130, application server 140, and registration server 150 may include the features described above in connection with one or more of FIGS. 1 and 2.

As further shown in FIG. 3, a user (not shown) may utilize user device 110 to perform a registration operation 310 with registration server 150. Registration operation 310 may include the user registering user device 110 for a broadcast video content service provided by network 100. In one example, the user may register (e.g., with a SSO or global login) through a web page (e.g., an intranet page) provided by registration server 150 to user device 110. The user may modify or add a mobile number (e.g., a MDN) associated with user device 110 from the web page. During registration operation 310, registration server 150 may limit a number of users for a particular location (e.g., to optimize network bandwidth and prevent traffic congestion). For example, if there are too many users registered in one particular location, then registration operation 310 may fail and user device 110 may receive a message indicating that registration has been denied (e.g., "Sorry, registration limitation reached for this location—please call this number xxx-xxx-xxxx if you have any questions"). If the registration of user device 110 is accepted by registration server 150, registration server 150 may provide a user profile 315 to application server 140 (e.g., to a user profile database). User profile 315 may include information associated with the user (e.g., a name, address, billing information, etc.) and user device 110 (e.g., a MDN, a MEID, a passcode, etc.).

Registration server 150 (e.g., via registration operation 310) may provide, to user device 110, a message (e.g., a SMS message) that instructs user device 110 about downloading and installing a mobile application 320. Mobile application 320 may include an application that enables user device 110 to access video broadcasts provided by network 100. Registration server 150 (e.g., via registration operation 310) may send a separate communication (e.g., an email) to the user's email account. The separate communication may include a passcode (e.g., a four-digit passcode) for user device 110. Using the instructions provided by the SMS message, user device 110 may download mobile application 320 and may install mobile application 320 on user device 110. The passcode (e.g., received via the email) may be entered by the user during installation of mobile application 320 on user device 110, and may be saved by user device 110 (e.g., for authenticating user device 110 each time user device 110 requests content from network 100).

After installation of mobile application 320, the user may test mobile application 320, as indicated by reference number 330, to determine if mobile application 320 is functioning properly. In the test, mobile application 320 may be authenticated by mobile server 120 via the MDN and passcode associated with user device 110. For example, the user may provide (e.g., via user device 110) a global login, a password, and the MDN to mobile server 120. Mobile server 120 may validate the global login and password by checking user profile 315 in application server 140. If the validation passes, mobile server 120 may save the global login and MDN in application server 140 (e.g., for mapping the MDN to the global login), and may provide user device 110 an indication of a successful login. User device 110 may save the MDN and passcode in a memory associated with user device 110. Alternatively, user device 110 may not save the MDN since it may be obtained through an application programming interface (API) associated with user device 110.

In typical scenarios, the global login and password are encrypted and saved to a user device. However, if the user device is lost or stolen and the encryption is decoded, the unauthorized user may gain access to billing information and other sensitive information. Saving the MDN and passcode (e.g., as described above) instead of the global login, may prevent the global login from being obtained when user device 110 is lost or stolen. If user device 110 is lost or stolen, the MDN and passcode may only be used for accessing streaming content and may not be used for gaining access to sensitive information.

If the authentication of user device 110 fails (e.g., as indicated by test failure 340), mobile server 120 may provide an error message (e.g., "Mobile device is not registered-authentication failed") to user device 110. If user device 110 is authenticated, mobile server 120 may provide an indication (e.g., a test pass indication 350) to streaming server 130, and mobile server 120 (or streaming server 130) may make sure that not too many users are using the same network (e.g., network 180) for video streaming (e.g., to prevent traffic congestion). For example, if a base station of network 180 provides wireless access to user device 110, mobile server 120 may set a threshold number of users (e.g., ten (10) concurrent connections) for the base station, which may not be exceeded. If the threshold number of users is not exceeded, streaming server 130 may provide a streaming URL 360 to user device 110. User device 110 may receive streaming URL 360, and may begin streaming from URL 360 using a video player associated with user device 110. Streaming URL 360 may be exposed to the Internet (i.e., others may access streaming URL 360), and thus, may be exposed to improper use. However, streaming URL 360 may be session based to protect against improper use (e.g., streaming URL 360 may be used by only one user device 110 and a session identifier (ID) may be periodically changed between user device 110 and streaming server 130).

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

FIG. 4 is a diagram of example interactions between components of another example portion 400 of network 100. As illustrated, example network portion 400 may include user device 110, mobile server 120, streaming server 130, application server 140, transcoding server 160, and content provider 170. User device 110, mobile server 120, streaming server 130, application server 140, transcoding server 160, and content provider 170 may include the features described above in connection with one or more of FIGS. 1-3.

If a user wishes to access streaming video content provided by network 100, user device 110 may provide login information 405 and a content request 410 to mobile server 120. Login information 405 may include the MDN and the passcode associated with user device 110, a model of user device 110, a network being used by user device 110, etc. Content request 410 may include a request for streaming video content provided by streaming server 130. In one example, content request 410 may include a protocol (e.g., HTTPS, real time streaming protocol (RTSP), etc.) for delivery of the requested content, an identifier associated with the requested content, etc. Mobile server 120 may utilize the MDN to perform a lookup (e.g., of a database in application server 140) for the global login associated with the MDN. Mobile server 120 may authenticate the login attempt by comparing the global login and the passcode to the user profiles provided in application server 140, as indicated by reference number 420. In one example, mobile server 120 may authenticate user device 110 via a secure data connection with application server 140 (e.g., provided behind firewall 190). If the global login and the passcode match a user profile (e.g., associated with user device 110), mobile server 120 may provide, to user device 110, an indication of a successful login. If the global login and/or the passcode do not match a user profile, mobile server 120 may deny user device 110 access to the requested content, or may request the user to input the global login and the passcode to the user device 110.

If the login is successful, mobile server 120 may provide a content link 430 and a license key 435 to user device 110 (e.g., directly to mobile application 320 so that the user cannot view content link 430 and/or license key 435). Content link 430 may include a content access URL that enables access to the requested content, such as a RTSP URL (e.g., rtsp://content.site.com/192245/liveevent?key_token=0123456789) or a HTTPS URL (e.g., https://content.site.com/192675/playlist?key_token=0123456789). License key 435 may include a key of any length (e.g., 32 bits, 64 bits, 128 bits, etc.). In order to obtain the requested content, user device 110 may provide content link 430 and license key 435 to streaming server 130. Streaming server 130 may verify or validate license key 435 with mobile server 120 (e.g., via a secure connection), as indicated by reference number 440. If license key 435 is verified, streaming server 130 may establish a secure connection 450 with user device 110. In one example, secure connection 450 may include a user datagram protocol (UDP) or a transmission control protocol (TCP) socket provided between user device 110 and streaming server 130 (e.g., that is maintained through the RTSP). In another example, secure connection 450 may include a TCP secure socket provided between user device 110 and streaming server 130 (e.g., that is maintained through the HTTPS protocol). After license key 435 is verified, mobile server 120 may invalidate license key 435 so that no other connections may utilize license key 435.

As further shown in FIG. 4, streaming server 130 may provide a request 460 for the content identified in content link 430 to transcoding server 160 (or directly to content provider 170). Transcoding server 160 may provide request 460 to content provider 170, and content provider 170 may provide the requested content (e.g., a video content stream) to transcoding server 160, as indicated by reference number 470. Transcoding server 160 may receive content stream 470 from content provider 170, and may transcode (or convert) content stream 470 to a format that user device 110 may utilize (e.g., to produce a transcoded content stream 480). In one example, transcoding server 160 may convert content stream 470 to an ITU-T H.264/MPEG4 format with a bit rate of 256 kbps. Transcoding server 160 may provide transcoded content stream 480 to streaming server 130, and streaming server 130 may provide, via secure connection 450, transcoded content stream 480 to user device 110 (e.g., for playback by a video player). In one implementation, the video player may be integrated into (e.g., interfaced with) mobile application 320 so that transcoded content stream 480 may only be played on user device 110 and may not be duplicated or saved for others to use.

As further shown in FIG. 4, mobile server 120 may monitor login connections of network 100 to ensure that no intruders attack network 100, as indicated by reference number 490. Streaming server 130 may monitor secure connection 450 to ensure that no other connection can be made with license key 435, as further indicated by reference number 490.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

FIG. 5 is a flow diagram of example interactions between components of still another example portion 500 of network 100. As illustrated, example network portion 500 may include user device 110, mobile server 120, and streaming server 130. User device 110, mobile server 120, and streaming server 130 may include the features described above in connection with one or more of FIGS. 1-4.

As further shown in FIG. 5, user device 110 may login to mobile server 120 and may request a content link (e.g., for a content stream), as indicated by reference number 510. User device 110 may provide a MDN and a passcode (e.g., via the login) to mobile server 120, as indicated by reference number 520. Mobile server 120 may perform a lookup to replace the MDN with a global login associated with user device 110, and may verify the global login and the passcode of user device 110 with a user profile database (e.g., provided in application server 140, not shown), as indicated by reference number 530. When user device 110 is verified (or validated), mobile server 120 may provide a content link with a license key to user device 110, as indicated by reference number 540.

In order to obtain the requested content, user device 110 may provide the content link and the license key to streaming server 130, as indicated by reference number 550. Streaming server 130 may validate the license key with mobile server 120, as indicated by reference number 560. When the license key is validated by streaming server 130, streaming server 130 may establish a secure connection with user device 110 and mobile server 120 may invalidate the license key (e.g., so that no other connection can use the same license key). Streaming server 130 may provide the requested content stream, via the secure connection, to user device 110, as indicated by reference number 570. Mobile server 120 may monitor the content stream to ensure that the license key is used by only one stream, as indicated by reference number 580. Mobile server 120 may also monitor the login of user device 110, and may disable the login if user device 110 repeatedly fails to login, as further indicated by reference number 580.

Although FIG. 5 shows example components of network portion 500, in other implementations, network portion 500 may include fewer components, different components, differently arranged components, and/or additional components than depicted in FIG. 5. Alternatively, or additionally, one or more components of network portion 500 may perform one or more other tasks described as being performed by one or more other components of network portion 500.

FIG. 6 is a flow chart of an example process 600 for broadcasting video content to mobile communication devices according to implementations described herein. In one implementation, process 600 may be performed by mobile server 120. In another implementation, some or all of process 600 may be performed by another device or group of devices, including or excluding mobile server 120.

As illustrated in FIG. 6, process 600 may include receiving login information and a content request from a user device (block 610), and authenticating, via a backend server, the user device based on the login information (block 620). For example, in implementations described above in connection with FIG. 4, user device 110 may provide login information 405 and content request 410 to mobile server 120. Login information 405 may include the MDN and the passcode associated with user device 110, a model of user device 110, a network being used by user device 110, etc. Content request 410 may include a request for streaming video content provided by streaming server 130. In one example, content request 410 may include a protocol (e.g., HTTPS, RTSP, etc.) for delivery of the requested content, an identifier associated with the requested content, etc. Mobile server 120 may utilize the MDN to perform a lookup (e.g., of a database in application server 140) for the global login associated with the MDN. Mobile server 120 may authenticate the login attempt by comparing the global login and the passcode to the user profiles provided in application server 140, as indicated by reference number 420.

As further shown in FIG. 6, if the user device is not authenticated (block 620-UNAUTHENTICATED), process 600 may include denying the user device access to the requested content (block 630). For example, in implementations described above in connection with FIG. 4, if the global login and/or the passcode do not match a user profile, mobile server 120 may deny user device 110 access to the requested content, or may request the user to input the global login and the passcode to the user device 110.

Returning to FIG. 6, if the user device is authenticated (block 620-AUTHENTICATED), process 600 may include providing a content link and a license key to the user device (block 640), and verifying the license key with a content delivery device that establishes a secure connection with the user device, retrieves the content, and provides a content stream to the user device via the secure connection (block 650). For example, in implementations described above in connection with FIG. 4, if the login is successful, mobile server 120 may provide content link 430 and license key 435 to user device 110. In order to obtain the requested content, user device 110 may provide content link 430 and license key 435 to streaming server 130. Streaming server 130 may verify or validate license key 435 with mobile server 120 (e.g., via a secure connection), as indicated by reference number 440. If license key 435 is verified, streaming server 130 may establish secure connection 450 with user device 110, and may provide, via secure connection 450, transcoded content stream 480 to user device 110 (e.g., for playback by a video player).

As further shown in FIG. 6, process 600 may include monitoring the content stream and the login associated with the user device (block 660). For example, in implementations described above in connection with FIG. 5, mobile server 120 may monitor the content stream to ensure that the license key is used by only one stream, as indicated by reference number 580. Mobile server 120 may also monitor the login of user device 110, and may disable the login if user device 110 repeatedly fails to login, as further indicated by reference number 580.

FIG. 7 is a flow chart of another example process 700 for broadcasting video content to mobile communication devices according to implementations described herein. In one implementation, process 700 may be performed by user device 110. In another implementation, some or all of process 700 may be performed by another device or group of devices, including or excluding user device 110.

As illustrated in FIG. 7, process 700 may include registering a user device with a registration server (block 710), receiving a mobile application from the registration server and installing the mobile application (block 720), and testing the mobile application after installation (block 730). For example, in implementations described above in connection with FIG. 3, registration operation 310 may include the user registering user device 110 for a broadcast video content service provided by network 100. In one example, the user may register (e.g., with a SSO or global login) through a web page (e.g., an intranet page) provided by registration server 150 to user device 110. Registration server 150 (e.g., via registration operation 310) may provide, to user device 110, a message (e.g., a SMS message) that instructs user device 110 about downloading and installing mobile application 320. Registration server 150 (e.g., via registration operation 310) may send a separate communication (e.g., an email) to the user's email account. Using the instructions provided by the SMS message, user device 110 may download mobile application 320 (e.g., from registration server 150) and may install mobile application 320 on user device 110. After installation of mobile application 320, the user may test mobile application 320, as indicated by reference number 330, to determine if mobile application 320 is functioning properly.

As further shown in FIG. 7, process 700 may include providing login information and a content request to a mobile server (block 740), receiving, if the login information is authenticated, a content link and a license key from the mobile server (block 750), and sending the content link and the license key to a content delivery device (block 760). For example, in implementations described above in connection with FIG. 4, user device 110 may provide login information 405 and content request 410 to mobile server 120. Mobile server 120 may authenticate the login attempt by comparing the global login and the passcode to the user profiles provided in application server 140, as indicated by reference number 420. If the login is successful, mobile server 120 may provide content link 430 and license key 435 to user device 110 (e.g., directly to mobile application 320 so that the user cannot view content link 430 and/or license key 435). In order to obtain the requested content, user device 110 may provide content link 430 and license key 435 to streaming server 130.

Returning to FIG. 7, process 700 may include establishing a secure connection with the content delivery device when the license key is validated by the content delivery device (block 770), and receiving, via the secure connection and from the content delivery device, the requested content stream based on the content link (block 780). For example, in implementations described above in connection with FIG. 4, if license key 435 is verified, streaming server 130 may establish secure connection 450 with user device 110. Streaming server 130 may provide request 460 for the content identified in content link 430 to transcoding server 160 (or directly to content provider 170). Transcoding server 160 may provide request 460 to content provider 170, and content provider 170 may provide the requested content (e.g., a video content stream) to transcoding server 160, as indicated by reference number 470. Transcoding server 160 may receive content stream 470 from content provider 170, and may transcode (or convert) content stream 470 to a format that user device 110 may utilize (e.g., to produce transcoded content stream 480). Transcoding server 160 may provide transcoded content stream 480 to streaming server 130, and streaming server 130 may provide, via secure connection 450, transcoded content stream 480 to user device 110 (e.g., for playback by a video player).

Systems and/or methods described herein may reliably broadcast video content (e.g., streaming video content or progressive download video content) to mobile communication devices. The systems and/or methods may provide authentication procedures that are integrated with backend servers and a mobile application executing on the mobile communication device. The systems and/or methods may provide session-based streaming content delivery to prevent unauthorized hijacking of the content. The mobile application may check with the backend servers to validate and update session keys, which may ensure seamless broadcast streaming.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or as "logic" that performs one or more functions. This component or logic may include hardware, such as an ASIC or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device, login information and a content stream request from a user device connected to a wireless access network;
   authenticating, by the computing device and via a backend server device, the user device based on the login information;
   providing, by the computing device and when the user device is authenticated, a content link and a license key to the user device, wherein the user device provides the content link and the license key to a content delivery device;
   receiving, by the computing device and from the content delivery device, a request to verify the license key; and
   sending, by the computing device, a verification of the license key to the content delivery device based on receiving the request, wherein the content delivery device establishes a secure connection with the user device via the wireless access network, retrieves the requested content stream based on the content link, and provides the content stream to the user device via the secure connection;
   where the login information includes a mobile directory number (MDN) and a passcode associated with the user device;
   where authenticating the user device includes comparing the MDN and the passcode associated with the user device to a user profile database provided in the backend server device and authenticating the user device when the MDN and the passcode match a user profile provided in the user profile database.

2. The method of claim 1, further comprising:
   denying the user device access to the requested content stream when the user device is not authenticated.

3. The method of claim 1, further comprising:
   monitoring the content stream provided by the content delivery device to ensure that the license key is used by a single content stream.

4. The method of claim 3, further comprising:
   monitoring the authentication of the user device, and
   denying the user device access to the requested content stream when the user device repeatedly fails to be authenticated.

5. The method of claim 1, where the content link includes one of:
   a real time streaming protocol (RTSP) uniform resource locator (URL), or
   a hypertext transfer protocol secure (HTTPS) URL.

6. The method of claim 1, where the secure connection includes one of:
   a real time streaming protocol (RTSP) socket connection, or
   a hypertext transfer protocol secure (HTTPS) socket connection.

7. A network device, comprising:
   a memory to store a plurality of instructions; and
   a processor to execute instructions in the memory to:
      receive login information and a content stream request from a user device connected to a wireless access network,
      authenticate, via a backend server device, the user device based on the login information,
      deny the user device access to the requested content stream when the user device is not authenticated,
      provide, when the user device is authenticated, a content link and a license key to the user device, wherein the user device provides the content link and the license key to a content delivery device,
      receive, from the content delivery device, a request to verify the license key; and
      send a verification of the license key to the content delivery device based on receiving the request, wherein the content delivery device establishes a secure connection with the user device via the wireless access network, retrieves the requested content stream based on the content link, and provides the content stream to the user device via the secure connections;
   wherein the login information includes a mobile directory number (MDN) and a passcode associated with the user device;
   wherein, when authenticating the user device, the processor is further to execute instructions in the memory to compare the MDN and the passcode associated with the user device to a user profile database provided in the backend server device, and authenticate the user device when the MDN and the passcode match a user profile provided in the user profile database.

8. The network device of claim 7, wherein the processor is further to execute instructions in the memory to:
   monitor the content stream provided by the content delivery device to ensure that the license key is used by a single content stream.

9. The network device of claim 7, wherein the processor is further to execute instructions in the memory to:
   monitor the login information of the user device, and
   deny the user device access to the requested content stream when the user device repeatedly fails to provide valid login information.

10. The network device of claim 7, wherein the content link includes one of:
    a real time streaming protocol (RTSP) uniform resource locator (URL), or
    a hypertext transfer protocol secure (HTTPS) URL.

11. The network device of claim 7, wherein the secure connection includes one of:
    a real time streaming protocol (RTSP) socket connection, or
    a hypertext transfer protocol secure (HTTPS) socket connection.

12. A method implemented by a user device connected to a wireless access network, the method comprising:
    registering, by the user device, with a registration server;
    receiving, by the user device and from the registration server, a first message, via a first communication method, instructing the user device to install a mobile application configured to receive streaming video content;
    receiving, by the user device and from the registration server, a second message, via a second communication method, wherein the second message includes a passcode for installing the mobile application;
    installing, by the user device, the mobile application on the user device based on the first message and based on the second message;

providing, by the user device, login information and a content stream request to a mobile server device using the installed mobile application;
receiving, by the installed mobile application on the user device and when the user device is authenticated based on the login information, a content link and a license key from the mobile server device;
sending, by the installed mobile application on the user device, the content link and the license key to a content delivery device;
establishing, by the installed mobile application on the user device and when the license key is validated by the content delivery device, a secure connection with the content delivery device via the wireless access network; and
receiving, by the installed mobile application on the user device and from the content delivery device via the secure connection, the requested content stream based on the content link;
where the login information includes a mobile directory number (MDN) and a passcode associated with the user device.

13. The method of claim 12, where the content link includes one of:
a real time streaming protocol (RTSP) uniform resource locator (URL), or
a hypertext transfer protocol secure (HTTPS) URL.

14. The method of claim 12, where the secure connection includes one of:
a real time streaming protocol (RTSP) socket connection, or
a hypertext transfer protocol secure (HTTPS) socket connection.

15. A user device connected to a wireless access network, comprising:
a memory to store a plurality of instructions; and
a processor to execute instructions in the memory to:
register the user device with a registration server;
receive, from the registration server, a first message, via a first communication method, instructing the user device to install a mobile application configured to receive streaming video content;
receive, from the registration server, a second message, via a second communication method, wherein the second message includes a passcode for installing the mobile application;
install the mobile application on the user device based on the first message and based on the second message;
provide login information and a content stream request to a mobile server device using the installed mobile application,
receive, by the installed mobile application and when the user device is authenticated based on the login information, a content link and a license key from the mobile server device,
send, by the installed mobile application, the content link and the license key to a content delivery device,
establish, by the installed mobile application and when the license key is validated by the content delivery device, a secure connection with the content delivery device via the wireless access network, and
receive, by the installed mobile application and from the content delivery device via the secure connection, the requested content stream based on the content link;
where the login information includes a mobile directory number (MDN) and a passcode associated with the user device.

16. The user device of claim 15, where the content link includes one of:
a real time streaming protocol (RTSP) uniform resource locator (URL), or
a hypertext transfer protocol secure (HTTPS) URL.

17. The user device of claim 15, where the secure connection includes one of:
a real time streaming protocol (RTSP) socket connection, or
a hypertext transfer protocol secure (HTTPS) socket connection.

* * * * *